(12) United States Patent
Bugajski et al.

(10) Patent No.: US 10,999,627 B2
(45) Date of Patent: May 4, 2021

(54) PLAYBACK MANIPULATION IN RESPONSE TO NOTIFICATION

(71) Applicant: ARRIS Enterprises, Inc., Suwanee, GA (US)

(72) Inventors: Marek Bugajski, Norcross, GA (US); Marcin Morgos, Warsaw (PL)

(73) Assignee: ARRIS Enterprises LLC, Suwanee, GA (US)

( * ) Notice: Subject to any disclaimer, the term of this patent is extended or adjusted under 35 U.S.C. 154(b) by 269 days.

(21) Appl. No.: 15/011,828

(22) Filed: Feb. 1, 2016

(65) Prior Publication Data

US 2016/0227278 A1   Aug. 4, 2016

Related U.S. Application Data

(60) Provisional application No. 62/110,128, filed on Jan. 30, 2015.

(51) Int. Cl.
*H04N 21/41* (2011.01)
*H04N 21/442* (2011.01)
(Continued)

(52) U.S. Cl.
CPC ...... *H04N 21/44227* (2013.01); *H04M 19/04* (2013.01); *H04N 21/4131* (2013.01);
(Continued)

(58) Field of Classification Search
CPC ......... H03N 21/44227; H03N 21/4131; H03N 21/4316; H03N 21/4318; H03N 21/4333;
(Continued)

(56) References Cited

U.S. PATENT DOCUMENTS

2003/0070182 A1\* 4/2003 Pierre ............... H04N 21/4325
725/135
2007/0053653 A1\* 3/2007 Huntington ........ H04N 21/6137
386/231
(Continued)

FOREIGN PATENT DOCUMENTS

WO          03/032634 A2     4/2003

OTHER PUBLICATIONS

PCT Search Report & Written Opinion, RE: Application No. PCT/US2016/015957, dated Apr. 25, 2016.

*Primary Examiner* — John R Schnurr
(74) *Attorney, Agent, or Firm* — Buchanan, Ingersoll & Rooney, PC

(57) ABSTRACT

Methods, systems, and computer readable media can be operable to facilitate playback manipulation based upon a received notification. A client device such as a set-top box may receive information associated with a notification, wherein the notification comprises a reminder or action that is to be completed. The client device may output information associated with the notification to a display that is being used to present content to a viewer, wherein the output of information includes an identification of the reminder or requested action. The reminder or action may be associated with a predetermined duration of time within which the action is to be completed. If the action is not completed within the predetermined duration of time, the client device may manipulate playback and output of the content to the display until a confirmation of the action being completed is received by the client device.

9 Claims, 7 Drawing Sheets

(51) Int. Cl.
    *H04N 21/433*     (2011.01)
    *H04N 21/436*     (2011.01)
    *H04N 21/472*     (2011.01)
    *H04M 19/04*     (2006.01)
    *H04N 21/431*     (2011.01)
    *H04N 21/439*     (2011.01)
    *H04N 21/488*     (2011.01)

(52) U.S. Cl.
    CPC ..... *H04N 21/4316* (2013.01); *H04N 21/4318* (2013.01); *H04N 21/4333* (2013.01); *H04N 21/4396* (2013.01); *H04N 21/43615* (2013.01); *H04N 21/47214* (2013.01); *H04N 21/4882* (2013.01)

(58) Field of Classification Search
    CPC ......... H03N 21/43615; H03N 21/4396; H03N 21/47214; H03N 21/4882; H04M 19/04
    USPC ................ 725/34, 56, 58; 327/514; 715/753
    See application file for complete search history.

(56) References Cited

U.S. PATENT DOCUMENTS

| | | | | |
|---|---|---|---|---|
| 2008/0140818 A1* | 6/2008 | Du Breuil | ............ | H04L 12/282 709/223 |
| 2010/0013551 A1* | 1/2010 | Reams | ................. | H04N 5/4403 327/544 |
| 2010/0241886 A1* | 9/2010 | Ho | ........................ | G06F 1/3215 713/323 |
| 2011/0041129 A1* | 2/2011 | Sakamoto | ............. | G06F 9/5038 718/100 |
| 2011/0043709 A1* | 2/2011 | Hirata | ................. | H04N 5/44513 348/734 |
| 2011/0200304 A1* | 8/2011 | Rutledge | .......... | H04N 21/44218 386/248 |
| 2014/0207468 A1* | 7/2014 | Bartnik | ................... | G10L 15/22 704/275 |
| 2014/0373074 A1* | 12/2014 | Hwang | .............. | H04N 21/4223 725/56 |
| 2015/0143406 A1* | 5/2015 | Cho | .................... | H04N 21/4131 725/32 |
| 2015/0163412 A1* | 6/2015 | Holley | .................. | G08B 25/08 348/143 |
| 2015/0326814 A1* | 11/2015 | Stephens | ................ | H04N 5/445 725/32 |
| 2016/0094888 A1* | 3/2016 | Peterson | ............ | H04N 21/4821 725/39 |
| 2016/0127765 A1* | 5/2016 | Robinson | ................ | H04N 5/775 725/12 |
| 2017/0006348 A1* | 1/2017 | Hardt | ................... | G08B 13/196 |

\* cited by examiner

PLAYBACK MANIPULATION IN RESPONSE TO NOTIFICATION

CROSS REFERENCE TO RELATED APPLICATION

This application is a non-provisional application claiming the benefit of U.S. Provisional Application Ser. No. 62/110,128, entitled "Freezing Display in Response to On-Screen Notifications," which was filed on Jan. 30, 2015, and is incorporated herein by reference in its entirety.

TECHNICAL FIELD

This disclosure relates to the delivery of a notification to a subscriber.

BACKGROUND

Typically, multiple services (e.g., video, voice, data, etc.) are received at a subscriber premise by a customer premise equipment device (e.g., gateway device), and the multiple services are provided to consumers over a local network (e.g., local area network (LAN), wireless local area network (WLAN), multimedia over coax alliance (MoCA) network, etc.). Devices connected to the local network may be configured to receive services offered by a service provider (e.g., multiple systems operator (MSO)) and may be configured to communicate with other devices connected to the local network.

The types of devices that may be connected to a local network continues to grow in number. For example, local network access is not limited to only multimedia devices (e.g., set-top boxes (STB), televisions, mobile devices, tablets, etc.), but is now available to a multitude of other home and personal devices (e.g., Internet of things (IoT) devices) such as appliances, wearables, home automation devices, health monitoring devices or equipment, automobile sensors, and others. Once connected to a local or home network, these devices may communicate with each other over the local or home network.

However, subscribers are left without a means for monitoring and easily accessing communications that may be passed between component devices making up the home network. Moreover, subscribers are without a system for integrating networked devices and a common user interface for monitoring and interacting with networked devices. For example, a message indicating that an action needs to be taken at a networked device may not be received by a user or the user may simply ignore the message. Therefore, it is desirable to improve upon methods and systems for delivering a request for action to a subscriber.

BRIEF DESCRIPTION OF THE DRAWINGS

Like reference numbers and designations in the various drawings indicate like elements.

DETAILED DESCRIPTION

Figure 1:
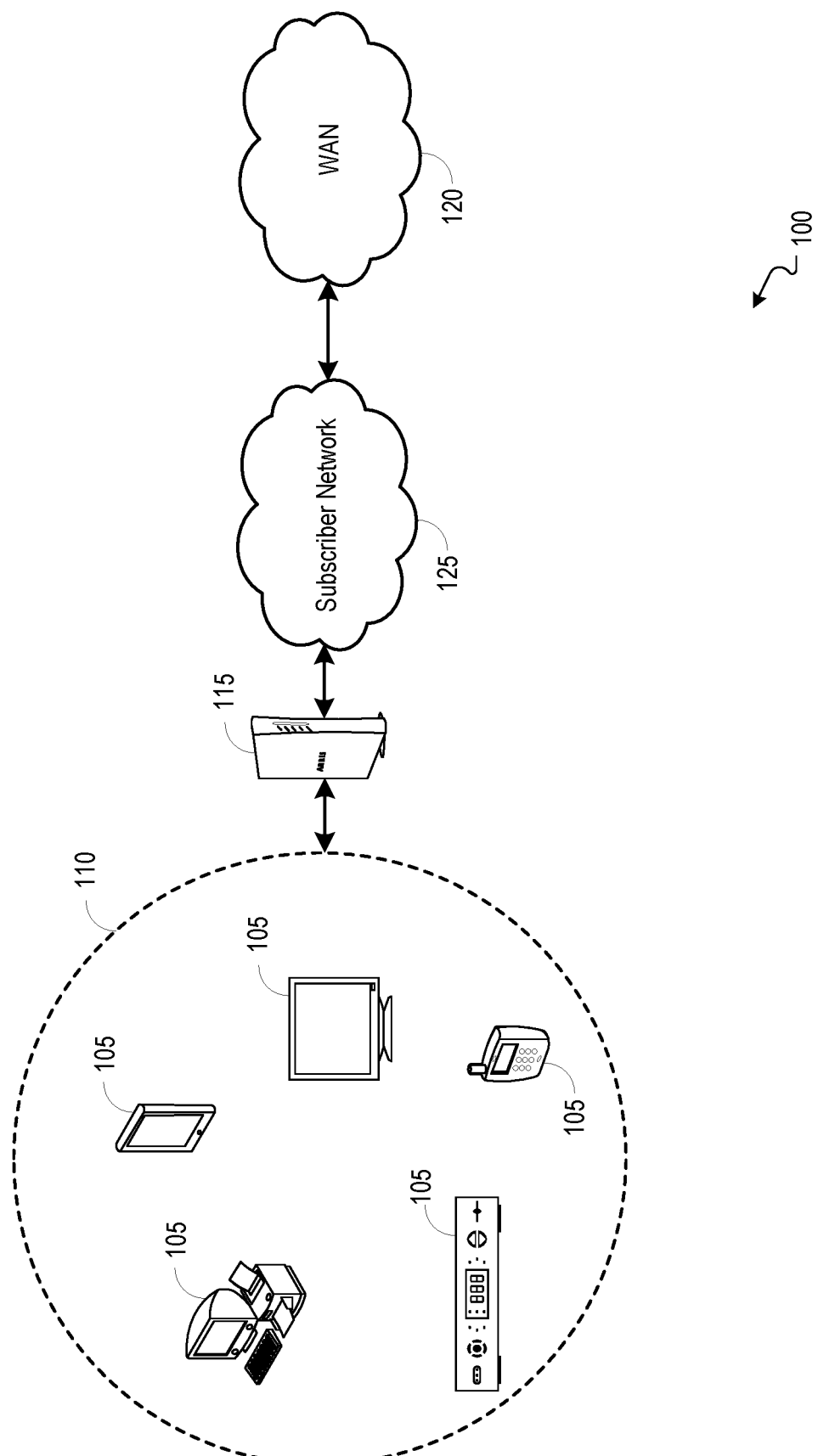
FIG. 1 is a block diagram illustrating an example network environment operable to facilitate playback manipulation based upon a received notification.

It is desirable to improve upon methods and systems for delivering a request for action to a subscriber. Methods, systems, and computer readable media can be operable to facilitate playback manipulation based upon a received notification. A client device such as a set-top box may receive information associated with a notification, wherein the notification comprises a reminder or action that is to be completed. The client device may output information associated with the notification to a display that is being used to present content to a viewer, wherein the output of information includes an identification of the reminder or requested action. The reminder or action may be associated with a predetermined duration of time within which the action is to be completed. If the action is not completed within the predetermined duration of time, the client device may manipulate playback and output of the content to the display until a confirmation of the action being completed is received by the client device.

An embodiment of the invention described herein may include a method comprising: (a) receiving a communication at a client device, wherein the communication comprises a notification identifying an action that is to be completed; (b) outputting content from the client device to a display; (c) outputting information associated with the notification to the display, wherein the information associated with the notification is displayed within a window overlaying the content; (d) determining that the action has not been completed after a predetermined duration of time; and (e) manipulating playback of the content.

According to an embodiment of the invention, the source of the notification is a device through which the action is to be completed, and the notification comprises an identification of the device through which the action is to be completed.

According to an embodiment of the invention, the method described above further comprises: (a) receiving a confirmation of the completion of the action; and (b) resuming normal playback of the content.

According to an embodiment of the invention, the method described above further comprises outputting results associated with the completed action to the display.

According to an embodiment of the invention, the source of the notification is a device through which the action is completed, and the confirmation of the completion of the action is received from the device through which the action is completed.

According to an embodiment of the invention, the notification comprises an identification of the predetermined duration of time, and the client device initiates a timer set for the predetermined duration of time when the notification is received.

According to an embodiment of the invention, manipulating playback of the content comprises pausing playback of the content.

An embodiment of the invention described herein may include an apparatus comprising: (a) one or more interfaces configured to be used to: (i) receive a communication, wherein the communication comprises a notification identifying an action that is to be completed; (ii) output content to a display; and (iii) output information associated with the notification to the display, wherein the information associated with the notification is displayed within a window overlaying the content; and (b) one or more modules configured to: (i) determine that the action has not been completed after a predetermined duration of time; and (ii) manipulate playback of the content.

An embodiment of the invention described herein may include one or more non-transitory computer readable media having instructions operable to cause one or more processors to perform the operations comprising: (a) receiving a communication at a client device, wherein the communication comprises a notification identifying an action that is to be completed; (b) outputting content from the client device to a display; (c) outputting information associated with the notification to the display, wherein the information associated with the notification is displayed within a window overlaying the content; (d) determining that the action has not been completed after a predetermined duration of time; and (e) manipulating playback of the content.

FIG. 1 is a block diagram illustrating an example network environment 100 operable to facilitate playback manipulation based upon a received notification. In embodiments, video, voice, and/or data services may be delivered to one or more client devices 105. Client devices 105 may include a television, mobile device, tablet, computer, set-top box (STB), gaming device, access points (APs), and any other device operable to receive video, voice, and/or data services. Client devices 105 may include Internet of things (IoT) devices such as appliances, wearables, home automation devices, and any other home or personal device configured to communicate over a local network. It should be understood that various services may be delivered to the client devices 105, including but not limited to, live or broadcast television, video-on-demand (VoD) content, pay-per view content, recorded content (e.g., DVR content), audio-only content, streaming content such as YouTube or Netflix content, and other various video, data, and/or voice services. It should be further understood that the devices shown in FIG. 1 may be integrated. For example, a television or other display device may be connected to and receive content from a STB.

Multiple services may be delivered to and communications may be passed between client devices 105 over a local network 110. The local network 110 may include a local area network (LAN), wireless local area network (WLAN), personal area network (PAN), mobile hotspot network, and others. The local network 110 may be provided at a subscriber premise by a central device 115. The central device 115 may include a gateway device, modem device, combination thereof or other access device. It will be appreciated by those skilled in the relevant art that delivery of the multiple services over the local network 110 may be accomplished using a variety of communication protocols, standards, and formats, and that client devices 105 may be capable of interacting and communicating with each other and/or with a central device 115 over various wireless communication standards (e.g., Wi-Fi, Zigbee, Bluetooth, etc.) or wired communication standards (e.g., Ethernet, Multimedia over Coax Alliance (MoCA), etc.).

In embodiments, multiple services (e.g., video, voice, and/or data services) may be delivered from a wide-area network (WAN) 120 to the local network 110 through a connection to a subscriber network 125. The subscriber network 125 may include an optical network, hybrid fiber coaxial (HFC) network, twisted-pair, mobile network, high-speed data network, satellite network, and others.

In embodiments, a client device 105, such as an IoT device, may be configured to deliver a notification to a user through another client device 105, such as a television or other display device connected to a STB. The STB may be configured to deliver multimedia content to the television during normal playback. When a notification is received at a STB, the STB may output the notification to a display on top of multimedia content that is being output by the STB to the display. It should be understood that the notification overlaying content that is described herein may be generated at various devices including, but not limited to a STB, a gateway device, and others. The notification may be output to multiple, various devices such as televisions, computers, mobile devices, tablets, and any other device at which a subscriber can receive content or that is connected to a STB or gateway device.

In embodiments, the notification output to the display may include an identification of a reminder or a request that the user perform a certain action. For example, the notification may provide an indication that the user needs to perform an action using a networked device such as an IoT device (e.g., turn off an appliance, take a health metric such as weight or blood pressure, etc.). The notification may include an identification of the specific device requesting performance of the user action and/or an identification of the specific user from which performance of the action is requested. The identification of the requested action, specific device, and/or specific user may be presented to a viewer of a display as one or more images within the output notification.

In embodiments, the notification may be output from the STB, or other CPE device, as an audio tone. For example, the notification may be output as an audio tone laid over program audio being output to a user. The audio notification may be a live voice notification or a pre-recorded notification.

In embodiments, a notification timer duration may be associated with a received notification. When a client device 105 (e.g., STB) receives a notification for output to a display, the client device 105 may initiate a timer. The timer may be set using a default duration or may be set at the notification timer duration associated with the received notification. The duration of the timer may provide a user with a certain amount of time to complete an action associated with the notification, and the duration may be based upon an expected amount of time for completion of the action. In embodiments, the client device 105 may include the duration of the timer within the notification that is output to the display device and the notification may show a countdown of the timer. It should be understood that the duration of the timer may be configured by various entities (e.g., a subscriber or user, multiple systems operator, device manufacturer, etc.).

In embodiments, when an action associated with a notification has been completed, the client device 105 (e.g., STB) outputting the notification may be notified of the completion of the action. A user may manually inform the client device 105 of the completed action (e.g., through the use of a remote control unit (RCU) or other control interface associated with the client device 105), or the client device 105 may receive notification of the completed action from a device associated with the completed action. For example, an appliance, medical device, or other device may recognize the completion of an action (e.g., powering down the appliance, taking a health metric using the medical device, etc.) and may output a communication (e.g., wireless communication) to the client device 105 informing the client device 105 of the completed action. When the client device 105 is notified of a completed action, the client device 105 may terminate the output of the notification to the display.

At the expiration of the timer, playback of content being output to the display may be manipulated if an action associated with the notification has not been completed. For example, if the action associated with the notification has not been completed, the client device 105 (e.g., STB) may pause playback of content being output to the display. The client device 105 may update the notification to inform a user of the playback manipulation resulting from the incompletion of the requested action. It should be understood that playback of content may be manipulated in other ways including, but not limited to, muting audio associated with the content, distorting or removing the display of the video associated with the content, and others.

Figure 2:
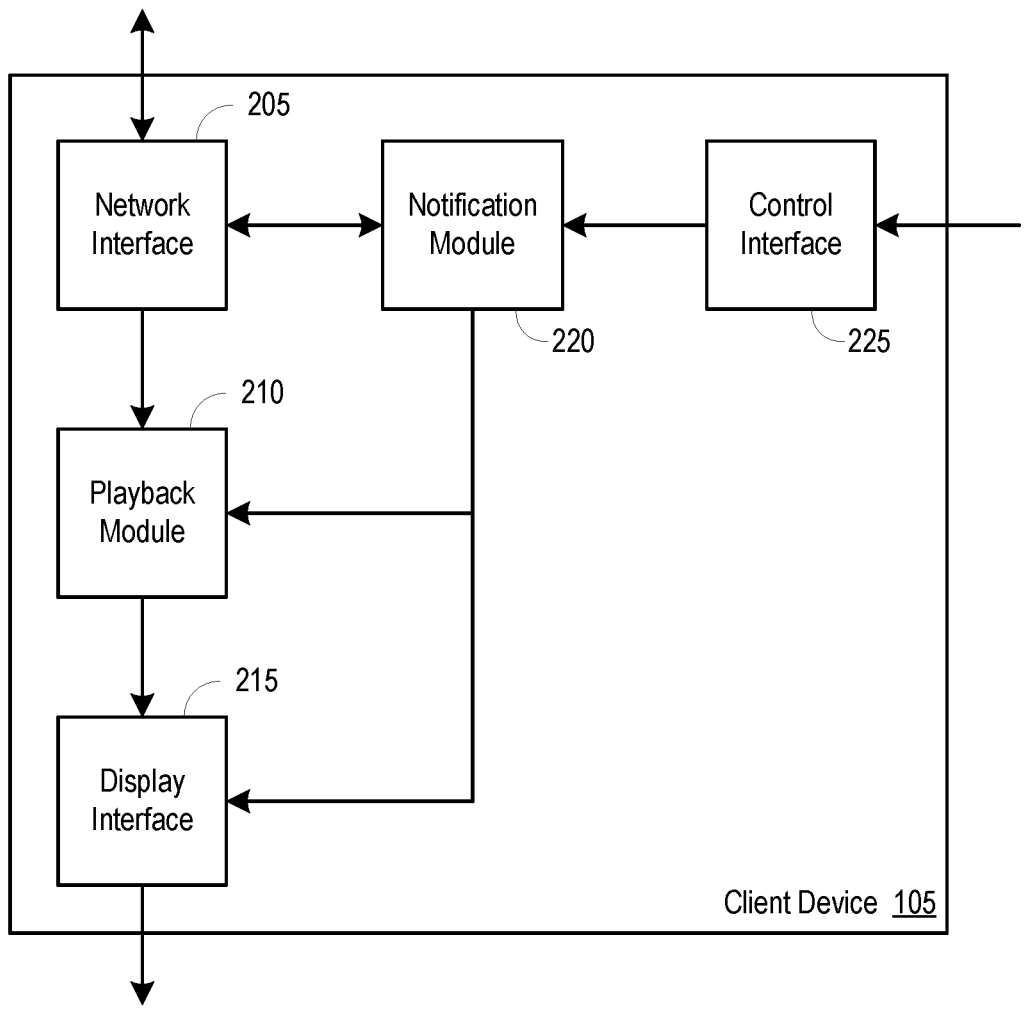
FIG. 2 is a block diagram illustrating an example client device operable to facilitate playback manipulation based upon a received notification.

FIG. 2 is a block diagram illustrating an example client device 105 operable to facilitate playback manipulation based upon a received notification. The client device 105 may be a STB, or any other device configured to output a communication to a multimedia device. The client device 105 may include a network interface 205, a playback module 210, a display interface 215, a notification module 220, and a control interface 225. It should be understood that the generation of a notification overlaying content may occur at a central device 115 such as a gateway device.

In embodiments, a notification may be received at the client device 105 from another client device 105 or a central device 115 of FIG. 1 via the network interface 205. The notification may include a reminder or a request for an action to be completed. The notification may further include an identification of a specific user that is to complete the action, an identification of a client device 105 (e.g., personal device, appliance, home automation device, medical device, etc.) that is to be used to complete the action, and/or a certain duration of time within which the action is to be completed. It will be appreciated by those skilled in the relevant art that various communication protocols and techniques, both wired and wireless, may be used to pass information from a networked device or central device (e.g., gateway device, access point, etc.) to the client device 105.

The client device 105 may receive multimedia content (e.g., through the network interface 205 or internal storage) and the playback module 210 may control the output of the multimedia content to a display device (e.g., television or other client device 105) through the display interface 215. For example, the playback module 210 may control trickplay (e.g., pause, rewind, fast-forward, skip, etc.) of video and/or audio of multimedia content that is output to a display.

When a notification is received at the client device 105, the notification module 220 may generate a notification for display to a viewer. The notification may include an identifier or description of the reminder or requested action, the specific user at which the notification is targeted, a device from which the notification was received, a duration of time within which the action is to be completed, and/or other information associated with the notification. The notification may be output to a display (e.g., television) as a window overlaying content that is being output to the display through the display interface 215.

In embodiments, the notification may include options allowing the viewer to retrieve more information associated with the notification or close the display of the notification. For example, the viewer may request more information or may postpone the reminder or requested action by closing the displayed notification using a remote control unit (RCU) or any other device from which signals or communications may be received through the control interface 225.

In embodiments, the notification module 220 may modify the displayed notification based upon a user response to the notification. When the requested action is completed, the notification module 220 may update the displayed notification to inform a viewer that the action has been completed and/or may terminate the output of the notification to the display. The notification module 220 may receive a communication indicating the completion of the activity from a user (e.g., as a signal received from a RCU through the control interface 225) or from a device (e.g., as a communication received through the network interface 205 from a device configured to communicate with the client device 105 or with a common central device 115 such as a gateway device or access point) through which the activity was completed.

When the client device 105 receives the notification, the notification module 220 may set a timer for a notification timer duration associated with the notification, and the notification module 220 may output a display showing a countdown of the timer within the displayed notification. When the requested action has not been completed after a predetermined duration of time (e.g., a timer set for the associated notification timer duration expires), the notification module 220 may cause a manipulation of the playback of multimedia content being output to the display. Playback manipulation may be controlled by the playback module 210. For example, when the notification timer expires without the requested action being completed, the notification module 220 may cause the playback module 210 to pause playback of multimedia content.

In embodiments, when playback is manipulated as a result of a failure to complete a requested action associated with a notification, the notification module 220 may update the displayed notification. For example, the notification module 220 may add a status descriptor to the displayed notification wherein the status descriptor informs a viewer that playback of the content has been manipulated (i.e., paused) due to the requested action remaining incomplete. The notification module 220 may include an animation (e.g., moving image, spinning wheel, etc.) within the displayed notification while playback of the content is paused to inform a viewer that the client device 105 is working properly and that the frozen picture is due to the requested action remaining incomplete.

If, while playback of the content is being manipulated by the playback module 210, the notification module 220 receives a communication indicating the completion of the associated action, the notification module 220 may cause the playback module 210 to resume normal playback of the content. In embodiments, the displayed notification may provide a user with an option for closing the notification window, resuming normal playback of the content, or confirming a completion of the associated action. For example, a signal may be received by the notification module 220 from a RCU through the control interface 225. In embodiments, the notification module 220 may receive, through the network interface 205, a communication from a device (e.g., appliance, personal device, home automation device, etc.) associated with the requested action, the communication providing a confirmation that the requested action has been completed.

Figure 3:
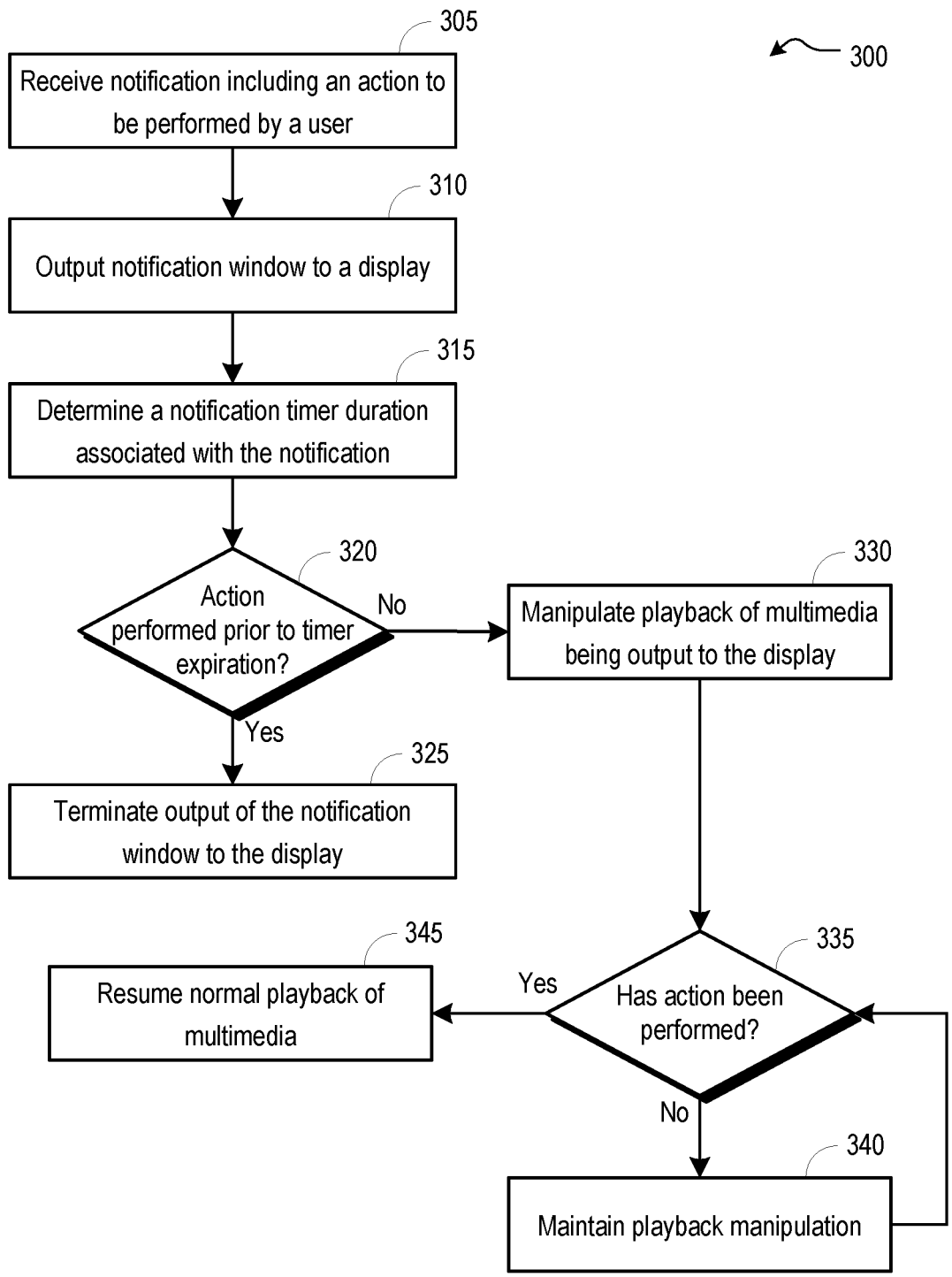
FIG. 3 is a flowchart illustrating an example process operable to facilitate the control of multimedia playback based upon a response to a notification.

FIG. 3 is a flowchart illustrating an example process 300 operable to facilitate the control of multimedia playback based upon a response to a notification. The process 300 can begin at 305, when a notification is received. The notification may be received at a client device 105 of FIG. 1 such as a STB. The notification may include an identification of a reminder or action that is to be performed by a user. The notification may include an identification of a specific user that is to complete the action, a specific device (e.g., personal device, appliance, home automation device, medical device, etc.) through which the action is to be completed, and/or a certain duration of time within which the action is to be completed.

At 310, a notification window may be output to a display. The notification window may be generated by a notification module 220 of FIG. 2 and may be output through a display interface 215 of FIG. 2 to a display (e.g., client device 105 including a display, such as a television). The notification window may include an identifier or description of the reminder or requested action, the specific user at which the notification is targeted, a device from which the notification was received, a duration of time within which the action is to be completed, and/or other information associated with the notification. The notification window may be output to a display (e.g., television) as a window overlaying content that is being output to the display from the client device 105.

At 315, a notification timer duration associated with the received notification may be determined. The notification timer duration may be determined, for example, by the notification module 220. In embodiments, the notification timer duration may be determined based upon information received within the notification. For example, the notification may identify a certain duration of time within which the associated action must be completed. When the notification timer duration is determined, the client device 105 may initiate a timer set for the determined duration.

At 320, a determination may be made whether an action associated with the notification has been performed prior to the expiration of the notification timer duration. The determination may be made, for example, by the notification module 220. In embodiments, the determination whether the action has been performed may be made based upon whether a communication or signal indicating completion of the action has been received at the client device 105. For example, a user may inform the client device 105 of the completion of the action (e.g., through a RCU or other control interface associated with the client device 105), or the device through which the action is completed may output a communication to the client device 105, the communication indicating to the client device 105 that the action has been completed.

If, at 320, the determination is made that the action has been performed prior to the expiration of the notification timer duration, the process 300 may proceed to 325. At 325, output of the notification window to the display may be terminated. In embodiments, when a signal or communication indicating completion of the action is received by the client device 105, the notification module 220 may update the displayed notification window to inform a viewer that the action has been completed and the notification module 220 may terminate the output of the notification window to the display.

If, at 320, the determination is made that the action has not been performed prior to the expiration of the notification timer duration, the process 300 may proceed to 330. At 330, playback of multimedia content being output to the display may be manipulated. In embodiments, playback of content may be manipulated, for example, by the playback module 210 of FIG. 2. For example, when the notification timer duration expires without an indication of completion of the action being received by the client device 105, the playback module 210 may pause playback of the multimedia content being output to the display.

At 335, a determination may be made whether the action associated with the notification has been performed. While playback of multimedia content is manipulated, the client device 105 may receive a communication indicating the completion of the associated action. For example, the displayed notification window may provide a user with an option for closing the notification window, resuming normal playback of the content, or confirming a completion of the associated action. A signal received from a user device (e.g., RCU) or a communication received from a networked device (e.g., appliance, personal device, home automation device, or other device through which the action may be performed) may be received at the client device 105 and may include a confirmation that the associated action has been performed. If the determination is made that no confirmation of the action being performed has been received at the client device 105, the playback manipulation (e.g., trickplay such as paused video) of the content may be maintained at 340.

If, at 335, the determination is made that the action associated with the notification has been performed (e.g., a confirmation of the action being completed is received at the client device 105), the process 300 may proceed to 345. At 345, normal playback of the multimedia content may be resumed. In embodiments, the playback module 210 may resume normal playback and output of the multimedia content to the display, and the notification module 220 may terminate the output of the notification window to the display.

Figure 4:
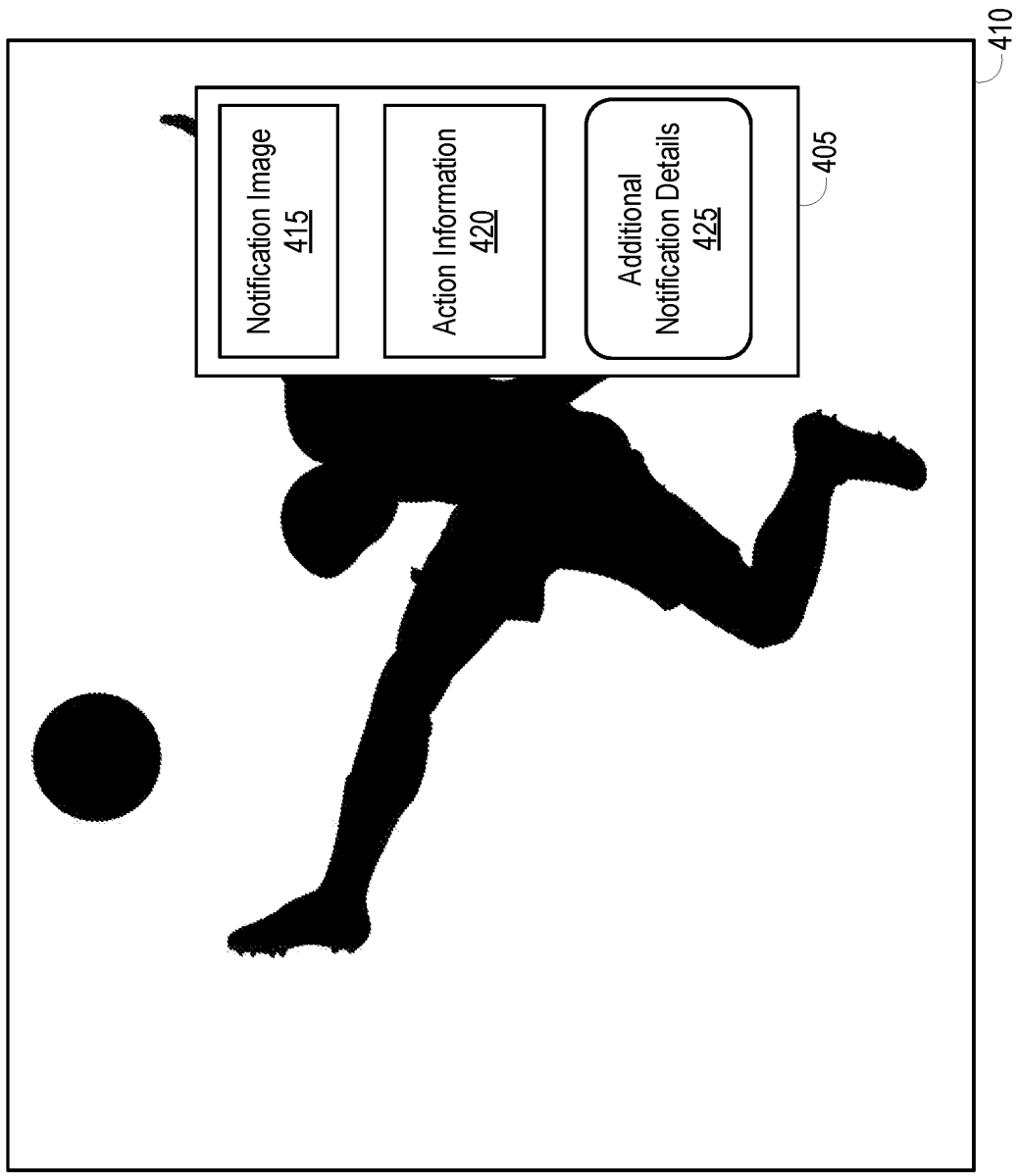
FIG. 4 is an illustration of an example notification window that may be displayed when a notification is received at a client device.

FIG. 4 is an illustration of an example notification window 405 that may be displayed when a notification is received at a client device. In embodiments, a client device 105 of FIG. 1 (e.g., STB) may receive a notification from another device (e.g., appliance, personal device, home-automation device, etc.) or central device 115 of FIG. 1, and the notification may identify a reminder or action that is to be completed, a specific user that is to complete the action, a specific device through which the action is to be completed, and/or a certain duration of time within which the action is to be completed. It should be understood that a notification may be received at a client device 105 from any device capable of communicating (e.g., via a wired or wireless communication) with the client device 105.

The notification window 405 may be output by the client device 105 to a display 410 associated with the client device 105. For example, the display 410 may be presented at a display device (e.g., television) connected to the client device 105. In embodiments, the notification window 405 may be overlaid on top of content (e.g., content being output from the client device 105) that is being displayed within the display 410. For example, the notification 405 may be displayed at an edge of the display 410.

In embodiments, the notification window 405 may include information associated with the received notification. The notification window 405 may include a notification image 415 that provides an identification of the requested action, a user that is to complete the action, and/or a device through which the action is to be completed. For example, the notification image 415 may include an image associated with the requested action, a user that is to complete the action, and/or a device through which the action is to be completed.

In embodiments, the notification window 405 may include action information 420. Action information 420 may include an identification of the specific reminder or action to be performed according to the notification. Action information 420 may include additional details associated with the action such as a specific user that is to perform the action, a specific device through which the action is to be performed, and/or a specific duration of time within which the action is to be performed.

In embodiments, reception of the notification by the client device 105 may trigger the initiation of a timer that is set for a predetermined duration of time associated with the notification. The duration of time within which the requested action is to be completed may be displayed to a user within the action information 420. Action information 420 may include a timer counting down from the predetermined duration of time to provide the viewer with an indication of the amount of time remaining for the action to be completed.

In embodiments, the notification window 405 may include additional notification details 425. Additional notification details 425 may include various information associated with the received notification (e.g., an identification of the source device associated with the notification). The additional notification details 425 may be displayed within the notification window 405 as a link. For example, the additional notification details 425 link may be selected by a user to request additional details associated with the notification, to suspend or postpone the display of the notification window 405, to close the notification window 405, to confirm a completion of the requested action, and/or others.

Figure 5:
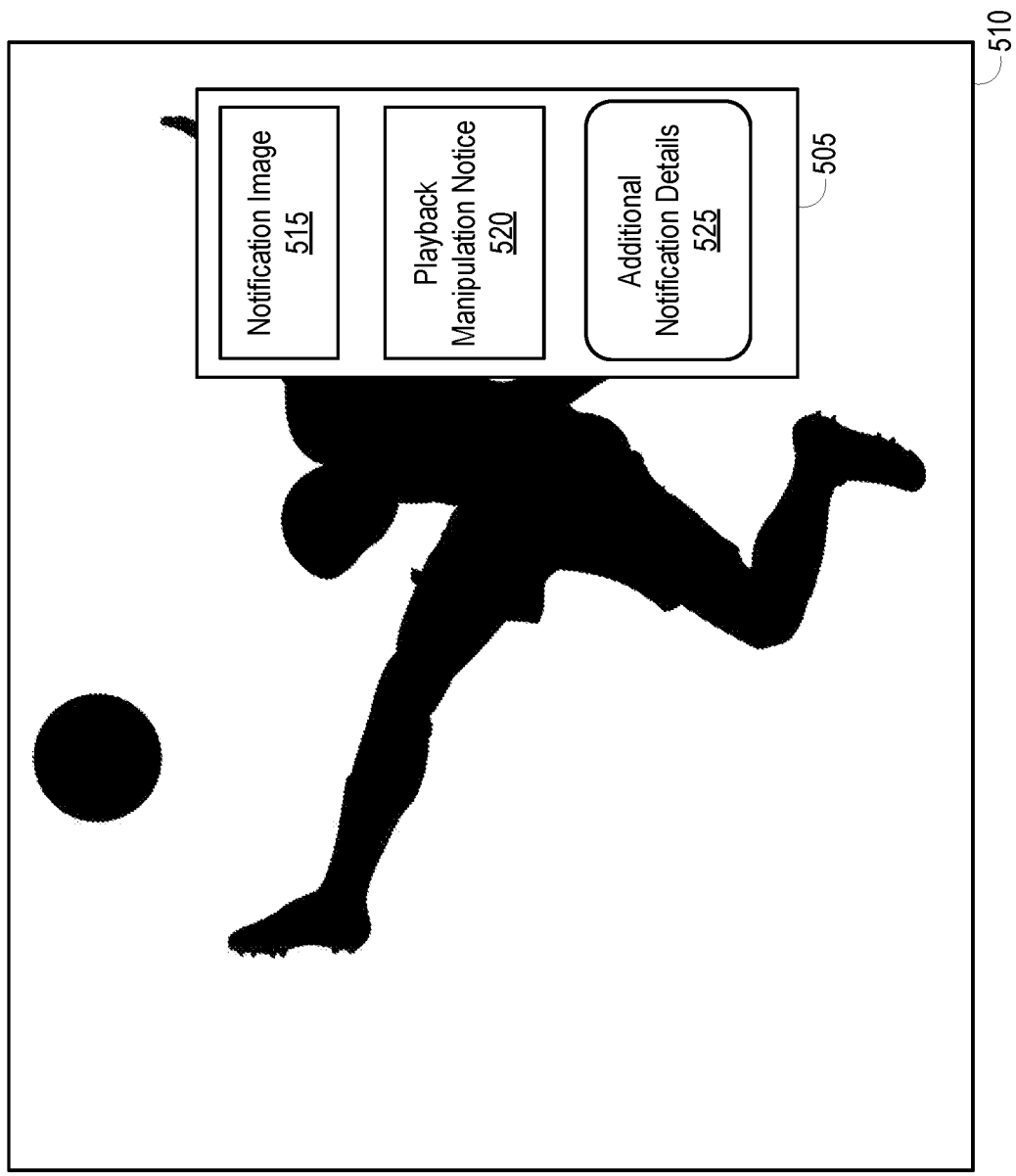
FIG. 5 is an illustration of an example notification window that may be displayed when multimedia playback is manipulated.

FIG. 5 is an illustration of an example notification window 505 that may be displayed when multimedia playback is manipulated. In embodiments, if a requested action associated with a notification received by a client device 105 of FIG. 1 (e.g., STB) is not completed before the expiration of a predetermined duration of time associated with the notification, the client device 105 may manipulate playback of content that is output from the client device 105 to a display 510. For example, the client device 105 may pause playback of the content or may otherwise cause the display 510 to be frozen. When playback is paused or the display 510 is otherwise frozen, the displayed notification window 505 may be updated to communicate to a subscriber that the pause or freeze has been initiated due to the action remaining in an incomplete state after the expiration of the predetermined duration of time.

The notification window 505 may be output by the client device 105 to a display 510 associated with the client device 105. For example, the display 510 may be presented at a display device (e.g., television) connected to the client device 105. In embodiments, the notification window 505 may be overlaid on top of content (e.g., content being output from the client device 105) that is being displayed within the display 510. For example, the notification 505 may be displayed at an edge of the display 510.

In embodiments, the notification window 505 may include information associated with the received notification. The notification window 505 may include a notification image 515 that provides an identification of the requested action, a user that is to complete the action, and/or a device through which the action is to be completed. For example, the notification image 515 may include an image associated with the requested action, a user that is to complete the action, and/or a device through which the action is to be completed.

In embodiments, the notification window 505 may include a playback manipulation notice 520. The playback manipulation notice 520 may include an indication that playback of content has been manipulated (e.g., paused). For example, the playback manipulation notice 520 may include text and/or an image providing an indication to the viewer that playback of the content has been manipulated as a result of the action associated with the notification remaining incomplete. The playback manipulation notice 520 may include additional information associated with the notification, including, but not limited to an identification of the specific reminder or action to be performed according to the notification, a specific user that is to perform the action, a specific device through which the action is to be performed, and/or a specific duration of time within which the action is to be performed.

In embodiments, the notification window 505 may include additional notification details 525. Additional notification details 525 may include information associated with the received notification (e.g., an identification of the source device associated with the notification). The additional notification details 525 may be displayed within the notification window 505 as a link. For example, the additional notification details 525 link may be selected by a user to request additional details associated with the notification, to suspend or postpone the display of the notification window 505, to close the notification window 505, to confirm a completion of the requested action, to resume playback of the content that is currently being manipulated by the client device 105 and/or others.

In embodiments, when playback of the content is manipulated, one or more elements of the notification window 505 may be animated to indicate to a viewer that the client device 105 or associated display device is not operating in a failed state and that the playback manipulation is a result of the action associated with the notification remaining in an incomplete state. For example, while playback of the content is manipulated, the notification image 515, or any other element within the notification window 505 may be animated.

In embodiments, when playback of the content is manipulated, an audio notification may be output to the user, wherein the audio notification requests that the action be completed by the user. The audio notification can be a live voice (e.g., a call) or a pre-recorded audio message. The notification can be a call session, or an instant messenger session. In embodiments, the audio notification can be a live audio session or a video chat may be enabled connecting the user (e.g., a patient) to another individual (e.g., a nurse), and the other individual can urge the user to complete the requested action while the program being viewed by the user is paused by the CPE device 105.

Figure 6:
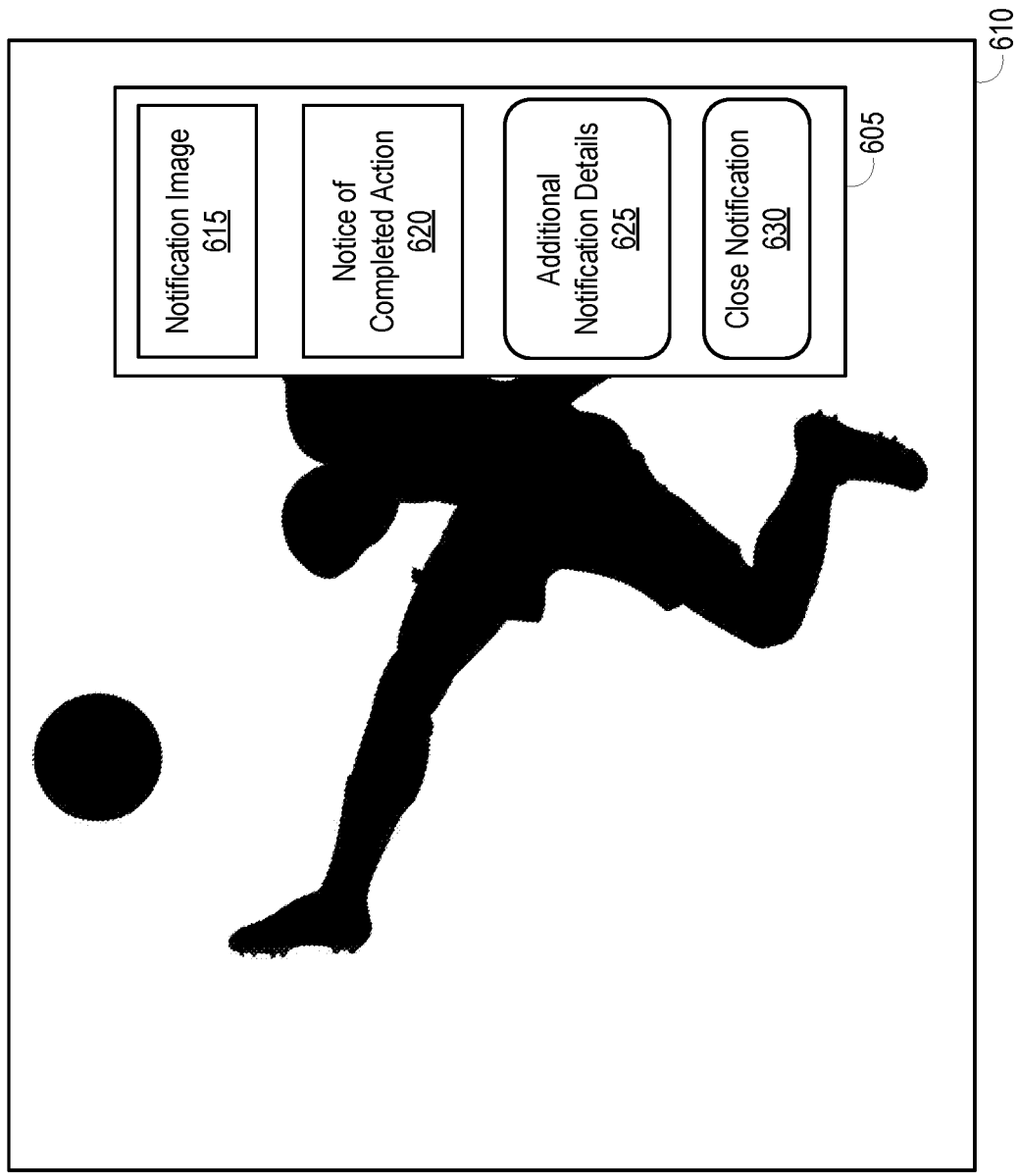
FIG. 6 is an illustration of an example notification window that may be displayed when an action associated with a notification has been completed.

FIG. 6 is an illustration of an example notification window 605 that may be displayed when an action associated with a notification has been completed. In embodiments, when an action associated with a notification is completed, the notification window 605 may be updated to inform a viewer that the requested action has been completed. For example, a client device 105 of FIG. 1 may receive a signal or communication from a user (e.g., via a RCU or other control interface) or a networked device (e.g., central device 115 of FIG. 1 or other device such as the device through which the action was completed), wherein the signal or communication confirms the completion of the action associated with the notification. When the client device 105 is informed of the completed action, the client device 105 may resume normal playback and output of content to a display 610.

The notification window 605 may be output by the client device 105 to a display 610 associated with the client device 105. For example, the display 610 may be presented at a display device (e.g., television) connected to the client device 105. In embodiments, the notification window 605 may be overlaid on top of content (e.g., content being output from the client device 105) that is being displayed within the display 610. For example, the notification 605 may be displayed at an edge of the display 610.

In embodiments, the notification window 605 may include information associated with the received notification. The notification window 605 may include a notification image 615 that provides an identification of the requested action, a user that is to complete the action, and/or a device through which the action is to be completed. For example, the notification image 615 may include an image associated with the requested action, a user that is to complete the action, and/or a device through which the action is to be completed.

In embodiments, the notification window 605 may include a notice of completed action 620. The notice of completed action 620 may include text and/or an image informing a viewer that the action associated with the notification has been completed and may include various other information associated with the completion of the action. For example, the notice of completed action 620 may include details associated with the time at which the action was completed, the individual completing the action, the device through which the action was completed, and others.

In embodiments, the notification window 605 may include additional notification details 625. Additional notification details 625 may include information associated with the received notification (e.g., an identification of the source device associated with the notification). The additional notification details 625 may be displayed within the notification window 605 as a link. For example, the additional notification details 625 link may be selected by a user to request additional details associated with the notification, to suspend or postpone the display of the notification window 605, to close the notification window 605, to confirm a completion of the requested action, to resume playback of the content that is currently being manipulated by the client device 105 and/or others. The additional notification details 625 link may be selected by a user to display results associated with the completed action. For example, results associated with the completed action may include, a time of completion, an identification of the user completing the action, and other results associated with the action (e.g., results of medical monitoring or tests).

In embodiments, the notification window 605 may include a close notification 630 option. The user may select the close notification 630 option (e.g., using a RCU or other control interface) to terminate the output of the notification window 605 from the client device to the display 610.

Figure 7:
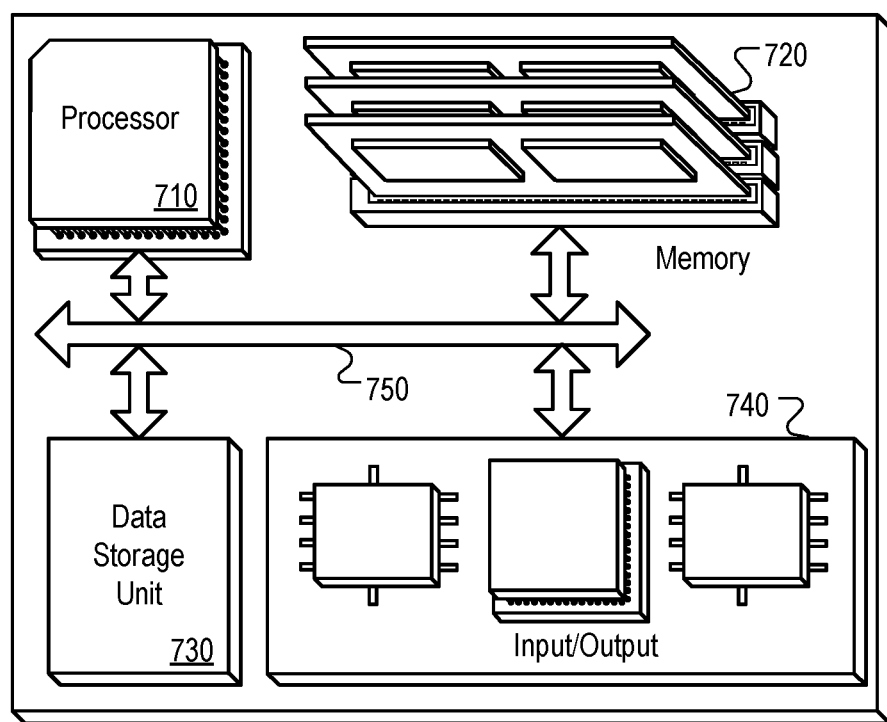
FIG. 7 is a block diagram of a hardware configuration operable to facilitate playback manipulation based upon a received notification.

FIG. 7 is a block diagram of a hardware configuration 700 operable to facilitate playback manipulation based upon a received notification. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, computer, tablet, mobile device, etc.) or central device 115 of FIG. 1 (e.g., gateway device, cable modem, server, etc.). In embodiments, the input/output device can include driver devices configured to send communications to, and receive communications from one or more networks (e.g., local network 110 of FIG. 1, subscriber network 125 of FIG. 1, WAN 120 of FIG. 1, etc.).

Those skilled in the art will appreciate that the invention improves upon methods and systems for delivering a request for action to a subscriber. Methods, systems, and computer readable media can be operable to facilitate playback manipulation based upon a received notification. A client device such as a set-top box may receive information associated with a notification, wherein the notification comprises a reminder or action that is to be completed. The client device may output information associated with the notification to a display that is being used to present content to a viewer, wherein the output of information includes an identification of the reminder or requested action. The reminder or action may be associated with a predetermined duration of time within which the action is to be completed. If the action is not completed within the predetermined duration of time, the client device may manipulate playback and output of the content to the display until a confirmation of the action being completed is received by the client device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:
1. A method comprising:
    receiving a communication at a client device, wherein the communication comprises a notification identifying an action that is to be completed, wherein the source of the notification is a device through which the action is to be completed, and wherein the notification comprises an identification of the device through which the action is to be completed;
    outputting content from the client device to a display;
    outputting information associated with the notification to the display, wherein the information associated with the notification is displayed within a window overlaying the content, and wherein the information displayed comprises a countdown of a certain duration of time, wherein expiration of the certain duration of time results in the content output from the client device being paused;
    setting a timer for the certain duration of time and initiating the timer in response to receiving the communication, wherein the timer is set and initiated at the client device;
    if a confirmation of the completion of the action is received prior to an expiration of the timer, terminating the display of the window overlaying the content when the confirmation of the completion of the action is received; and
    if a confirmation of the completion of the action is not received at the client device prior to the expiration of the timer,
manipulating playback of the content, wherein manipulating playback of the content comprises pausing playback of the content until a confirmation of the completion of the action is received, at which point, normal playback of the content is resumed.

2. The method of claim 1, further comprising:
    outputting results associated with the completed action to the display.

3. The method of claim 1, wherein the source of the notification is the device through which the action is completed, and wherein the confirmation of the completion of the action is received from the device through which the action is completed.

4. An apparatus comprising:
    one or more interfaces that:
        receive a communication, wherein the communication comprises a notification identifying an action that is to be completed, wherein the source of the notification is a device through which the action is to be completed, and wherein the notification comprises an identification of the device through which the action is to be completed;

output content to a display; and output information associated with the notification to the display, wherein the information associated with the notification is displayed within a window overlaying the content, and wherein the information displayed comprises a countdown of a certain duration of time, wherein expiration of the certain duration of time results in the content output from the client device being paused; and one or more modules that:

set a timer for the certain duration of time and initiate the timer in response to receiving the communication, wherein the timer is set and initiated at the apparatus;

if a confirmation of the completion of the action is received prior to an expiration of the timer, terminating the display of the window overlaying the content when the confirmation of the completion of the action is received; and if a confirmation of the completion of the action is not received prior to the expiration of the timer, manipulate playback of the content, wherein manipulating playback of the content comprises pausing playback of the content until a confirmation of the completion of the action is received, at which point, normal playback of the content is resumed.

5. The apparatus of claim 4, wherein the one or more interfaces further output results associated with the completed action to the display.

6. The apparatus of claim 4, wherein the source of the notification is the device through which the action is completed, and wherein the confirmation of the completion of the action is received from the device through which the action is completed.

7. One or more non-transitory computer readable media having instructions operable to cause one or more processors to perform the operations comprising:

receiving a communication at a client device, wherein the communication comprises a notification identifying an action that is to be completed, wherein the source of the notification is a device through which the action is to be completed, and wherein the notification comprises an identification of the device through which the action is to be completed;

outputting content from the client device to a display;

outputting information associated with the notification to the display, wherein the information associated with the notification is displayed within a window overlaying the content, and wherein the information displayed comprises a countdown of a certain duration of time, wherein expiration of the certain duration of time results in the content output from the client device being paused;

setting a timer for the certain duration of time and initiating the timer in response to receiving the communication, wherein the timer is set and initiated at the client device;

if a confirmation of the completion of the action is received prior to an expiration of the timer, terminating the display of the window overlaying the content when the confirmation of the completion of the action is received; and if a confirmation of the completion of the action is not received at the client device prior to the expiration of the timer, manipulating playback of the content, wherein manipulating playback of the content comprises pausing playback of the content until a confirmation of the completion of the action is received, at which point, normal playback of the content is resumed.

8. The one or more non-transitory computer-readable media of claim 7, wherein the instructions are further operable to cause the one or more processors to perform the operations comprising:

outputting results associated with the completed action to the display.

9. The one or more non-transitory computer-readable media of claim 7, wherein the source of the notification is the device through which the action is completed, and wherein the confirmation of the completion of the action is received from the device through which the action is completed.

* * * * *